United States Patent [19]

Roller et al.

[11] Patent Number: 4,679,916
[45] Date of Patent: Jul. 14, 1987

[54] OPTICAL VIEWING APPARATUS WITH TWO MIRRORS CONSECUTIVELY REFLECTING THE LINE OF SIGHT

[76] Inventors: Robert A. Roller, 226 Day St., Tallahassee, Fla. 32304; Warren L. Roller, 873 Ashwood Dr., Wooster, Ohio 44691

[21] Appl. No.: 836,293

[22] Filed: Mar. 5, 1986

[51] Int. Cl.⁴ .................... G02B 23/08; G02B 17/06; G02B 7/18

[52] U.S. Cl. .................... 350/623; 350/618; 350/638; 350/582; 2/426; D16/111

[58] Field of Search ............. 350/618, 619, 623, 624, 350/626, 638; 2/426, 422; D2/234

[56] References Cited

U.S. PATENT DOCUMENTS 1,733,869 10/1929 Edwards ........................ 350/618
1,885,744 11/1932 Malcom ......................... 350/623
2,522,938 9/1950 Francis et al. ................ 350/623
3,019,689 2/1962 Paulsrud ....................... 350/638
3,058,392 10/1962 Primeau ........................ 350/623
3,594,069 7/1971 Harvey ......................... 350/638
4,375,316 3/1983 Le Vantine .................... 350/623

FOREIGN PATENT DOCUMENTS 241921 6/1926 United Kingdom ............... 350/618

Primary Examiner—Jon W. Henry
Attorney, Agent, or Firm—Thomas S. Baker, Jr.

[57] ABSTRACT

An optical viewing apparatus adapted to be worn on the face of a wearer which enables a bicycle rider in a racing crouch position to view the road in front of the rider while looking downwardly towards the road is disclosed.

11 Claims, 6 Drawing Figures

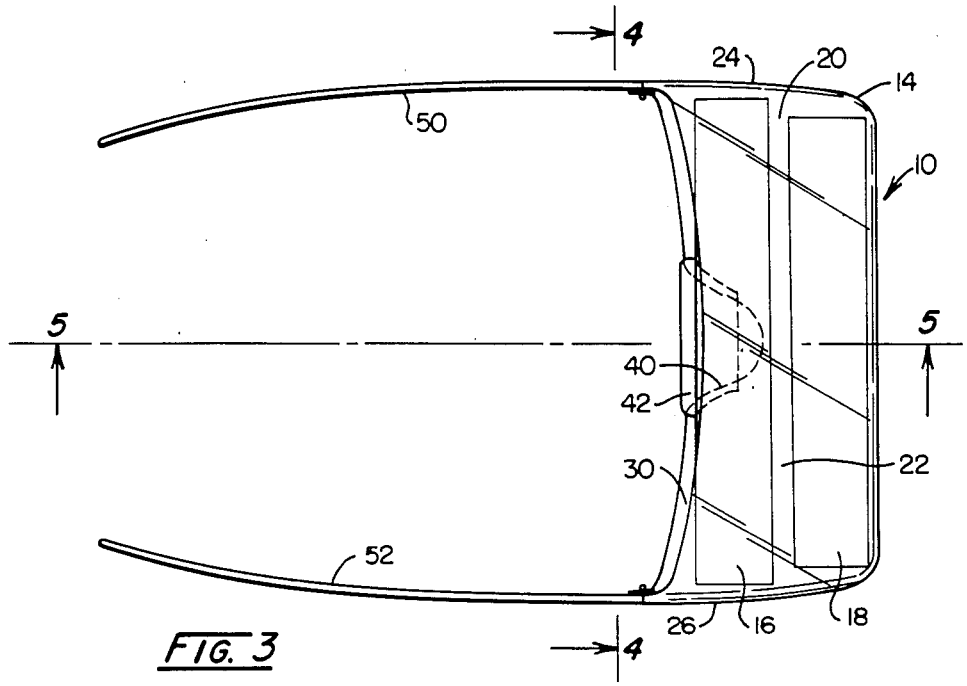
FIG. 3
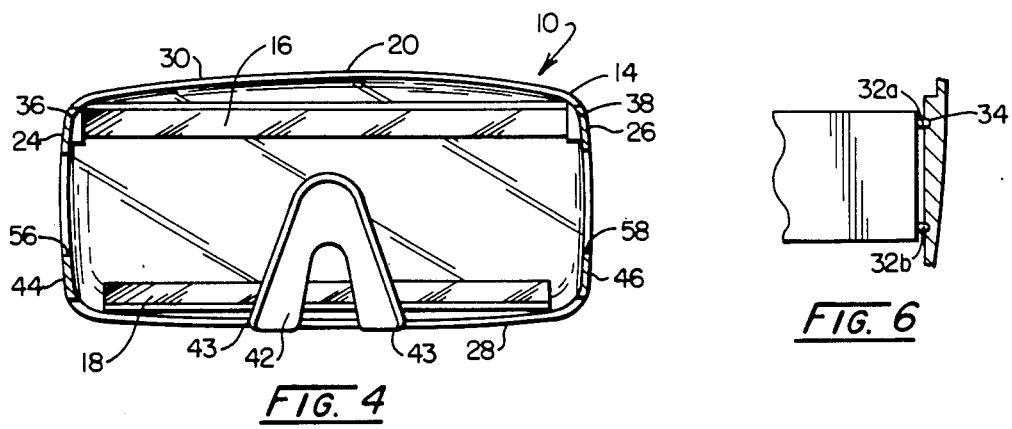
FIG. 4
FIG. 6
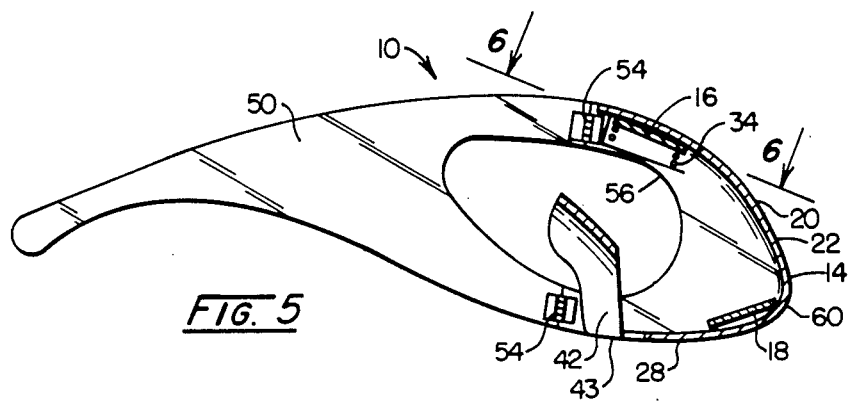
FIG. 5

OPTICAL VIEWING APPARATUS WITH TWO MIRRORS CONSECUTIVELY REFLECTING THE LINE OF SIGHT

BACKGROUND OF THE INVENTION

Rolling resistance and aerodynamic drag or wind resistance are major factors in limiting the speeds which are attainable by a bicycle rider and in causing the bicycle rider to become fatigued. Advances in bicycle construction and design technology have reduced the rolling resistance of the bicycle and the resistance caused by the force of the air acting on the bicycle. It has been estimated that approximately 85% of the resistance caused by the force of the air acting on a bicycle and rider is attributable to the force of the air acting on the rider alone because the frontal area of the rider is much greater than the frontal area of the bicycle. A bicycle rider in a full upright position with the torso perpendicular to the ground, with the arms straight out in front, and with the hands resting on the upper portion of the handle bars provides maximum frontal area for the wind to act upon and encounters maximum wind resistance while riding. In contrast thereto, a bicycle rider in a full racing crouch position with the torso generally parallel to the ground, with the legs tucked in, with the elbows bent, and with the hands on the dropped portion of the handlebars provides a greatly reduced frontal area for the wind to act upon and encounters significantly less wind resistance while riding than a rider in the full upright position. Because of the increased speed and reduced fatigue which a rider achieves from reduced wind resistance while riding in a full racing crouch position, it is desirable for bike a rider to maintain this position as long as possible. It is especialy desirable to maintain the racing crouch position if the rider is riding the bicycle in a competitive event such as a bicycle as race or a triathlon. However, unless the rider is riding on a track where the lanes are marked and may be seen by viewing the ground, the rider must raise the head from a position where the face is generally parallel to the ground to a position where the face is looking ahead to enable the rider to see the road in front of the bicycle.

Unfortunately, it is extremely uncomfortable for a rider to simultaneously maintain a racing crouch position with the torso parallel to the ground and to bend the neck and raise the head sufficiently to enable the road in front to be seen for an extended length of time. Consequently, a rider must raise up from the racing crouch position towards the full upright position frequently and in so doing encounters more wind resistance. It has been estimated that if a professional bike rider could maintain a full racing crouch position for the entire distance of a 50 mile race, the time for riding that distance would be reduced by several minutes.

One device to enable a bicycle rider in a racing crouch position to see in front while looking downwardly is described in U.S. Pat. No. 4,375,316 to LeVantine. This device is comprised essentially of a pair of reflecting surfaces which are mounted on the handlebars of a bicycle and which are adjusted to enable a rider looking downwardly into one surface to see the road in front. The device has several disadvantages. One disadvantage is that vibrations in the frame are transmitted to the reflecting surfaces which distorts the images observed by the rider. Additionally, the rider's field of vision depends upon the direction the handlebars are pointed. Thus, the rider will have a view of the side of the road only if the handlebars are pointed in that direction. In the LeVantine device the rider's head must be in one position to obtain the optimum view of the road ahead. However, during a bicycle race a rider must change the riding position, e.g. stand up on the pedals toa djust the different conditions such as hills or severe head winds. Although the rider's torso will remain substantially parallel to the ground, the position of the head will change. Also, during a race a rider does not have time to safely adjust mirrors to accommodate different riding positions. A further disadvantage of the frame mounted reflecting surfaces is that they provide a significant area for the wind to act upon, i.e. they increase wind resistance.

It is desirable to provide a device which will enable a bicycle rider in a racing crouch position to view the road ahead while looking downwardly towards the road, which is not affected by frame vibrations, which will enable a rider to have a view of the sides of the road regardless of the direction the handlebars are pointed, which provides the rider with an optimum view of the road ahead despite the riding position, and which does not required adjustment.

SUMMARY OF THE INVENTION

The present invention is addressed to an optical viewing apparatus adapted to be worn on the head of a wearer which comprises a frame adapted to be worn by a wearer about the eyes and a first mirror and a second mirror of which both are mounted to the frame in spaced apart relationship. One of the mirrors is positioned closer to the face of the wearer than the other of the mirrors and the mirrors are oriented such that the wearer can view objects in front of the wearer while the head is in a downwardly looking position.

Other features of the invention, in part, will be obvious and, in part, will appear hereinafter.

The invention, accordingly, comprises the apparatus and method possessing the construction, combination of elements, arrangement of parts, and steps which are exemplified in the following detailed description.

For a fuller understanding of the nature and features of the invention, reference should be had to the following detailed description taken in conjunction with the accompanying drawings.

BRIEF DESCRIPTION OF THE DRAWINGS

FIG. 3 is a top plan view of the optical viewing apparatus;

FIG. 4 is a rear view of the present invention along line 4—4 of FIG. 3;

FIG. 5 is a sectional view along line 5—5 of FIG. 3; and

FIG. 6 is a partial sectional view along line 6—6 of FIG. 5.

DETAILED DESCRIPTION OF THE INVENTION

The present invention provides an optical viewing apparatus which will enable a bicycle rider in a racing crouch position to view the road in front of the bicycle while looking downwardly towards the road, which is not affected by frame vibrations, which will enable a rider to have a view of the sides of the road regardless of the direction the handlebars are pointed, which provides the rider with an optimum view of the road ahead despite the riding position, which does not increase wind resistance, and which does not require adjustment.

Figure 1:
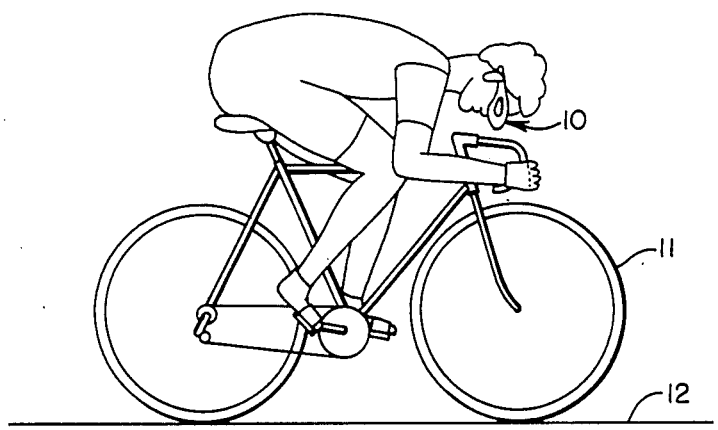
FIG. 1 illustrates a bicycle rider in a racing crouch position utilizing the optical viewing apparatus of the present invention.
Figure 2:
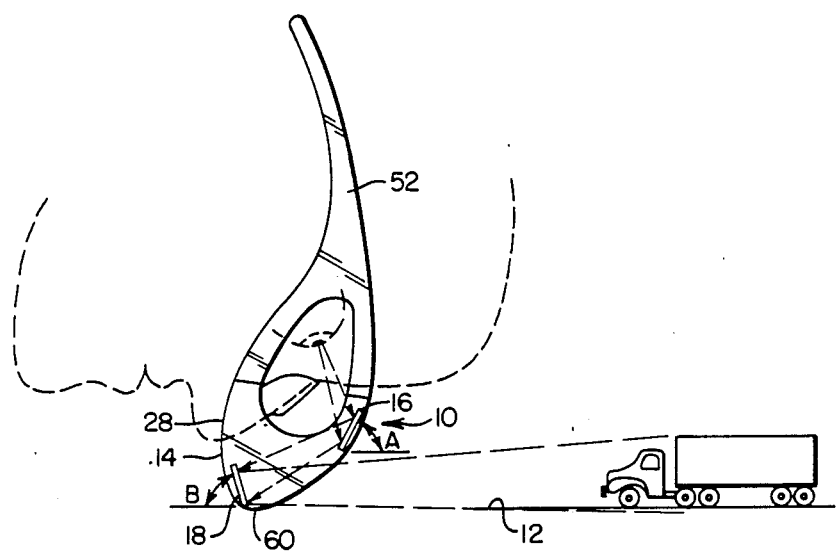
FIG. 2 is an enlarged view of the bicycle rider's head in phantom looking downwardly through the optical viewing apparatus of the present invention to obtain a view of the road ahead.

Looking to FIG. 1, a rider is shown wearing the optical viewing apparatus 10 of the present invention and riding bicycle 11 while in a racing crouch position in which the torso is substantially parallel to the road 12, the elbows are bent, the hands are on the dropped portion of the handlebars, and the face is pointed towards the road 12. In FIG. 2, the rider is shown looking through the optical viewing apparatus 10 to obtain a view of the road in front of bicycle 11 while the face is directed downwardly towards the road 12. Details of construction of the optical viewing apparatus 10 may be seen by referring to FIGS. 3-6.

The optical viewing apparatus 10 includes a frame 14 which mounts a pair of rectangular mirrors 16 and 18 as may be seen by referring to FIG. 3. Frame 14 includes a smooth, transparent hood 20 which overlies mirrors 16 and 18. Hood 20 has a curved front surface 22, a pair of side surfaces 24 and 26, an integral lower surface 28, and a top edge which is positioned adjacent the forehead of a wearer when the apparatus 10 is worn. A pair of tabs 32a and 32b are fixed to both ends of mirrors 16 and 18. The tabs 32a and 32b are received in shallow indentations 34 formed in the side surfaces 24 and 26 of hood 20 as illustrated in FIG. 6. A plurality of indentations 34 which may be seen by referring to FIG. 5 are formed in the upper portions 36 and 38 of the side surfaces 24 and 26, respectively, to enable the angle of mirror 16 to be adjusted to obtain an optimum or preferred field of vision. Although no adjustment is illustrated for mirror 18, the same type of adjustment may be provided for mirror 18 if it is desired. It has been determined that the viewer will have an optimum field of vision if mirror 16 is set at an angle A of approximately 65° with respect to a line parallel to road 12 and if mirror 18 is set at an angle B of approximately 75° with respect to a line parallel to the road 12 as illustrated in FIG. 2. A detachable nose piece 42 having the shape of an inverted V (which is best seen in FIG. 4) is mounted in the lower surface 28 of frame 14. The central portion 40 of lower surface 28 is recessed to provide space for a wearer's nose and the lower edge 43 of nose piece 42 has a groove, not shown, formed therein which receives the edge of the central portion 40 of lower surface 28. Different sizes of nose pieces 42 may be utilized to custom fit the frame 14 to a wearer's face.

Each of a pair of temples 50 and 52, which are bifurcated at one end, are pivotally attached at the bifurcated end to the side surfaces 24 and 26, respectively, of hood 20 by a pair of metal hinges 54. The opposite ends of the temples 50 and 52 are adapted to be worn over the ears of a wearer to thereby support the frame 14 on the head of a wearer. The frame 14 and the temples 50 and 52 may be plastic and may be molded as a single unit. Additionally, an elastic strap or a pair of straps having Velcro fasteners also may be used to retain the frame 14 on the face of a wearer in place of the temples 50 and 52.

Looking again to FIG. 2 it may be seen that mirror 16 is located above the straight forward or medial line of sight of the wearer and that mirror 18 is located below the medial line of sight of the wearer. Additionally, mirror 16 is spaced horizontally from mirror 18 when the head of the wearer is in the downwardly looking position. This horizontal spacing of mirrors 16 and 18, which also may be seen in FIG. 4, enables the wearer to look straight ahead and to see between the mirrors if so desired. An example of when a wearer may want to look straight ahead and view the road by looking between the mirrors would be when the wearer is approaching a busy intersection or when the wearer encounters an emergency situation. Thus, the wearer may ride in an upright position with the face in a forwardly looking position and see the road ahead without removing the optical viewing apparatus 10. It should be observed that mirror 18 is displaced vertically from mirror 16 when the head of the wearer is in the downwardly looking position. This is necessary so that the upper mirror 16 does not block the lower mirror 18 from receiving an image and thereby limit the wearer's field of vision.

It has been found desirable to provide openings 56 and 58 in the side surfaces 26 and 28, respectively, of frame 14 to allow air to reach and to cool that portion of the wearer's face which is covered by the viewing apparatus 10. Additionally, the lower surface 28 of frame 14 and a portion of the top edge 30 of frame 14 may be recessed outwardly from the face of the wearer to enable additional air to flow to the wearer's face. The opening in the lower surface 28 also enables the wearer to view the lower half of his body, the bicycle, and the road which retains the wearer's immediate visual contact with the road. Openings also may be formed in the front surface 22 of the hood 20 to enable air to flow to the face of the wearer. A drain hole 60 is bored in frame 14 between the front surface 22 and the lower surface 28 thereof to enable any moisture which accumulates within the frame 14 to drain out.

In order to utilize the optical viewing apparatus 10 of the present invention, the wearer places it on the face by putting the nose piece 42 over the nose and the temples 50 and 52 over the ears. Turning to FIG. 2, when the head is in the downwardly looking position, the wearer can view the road ahead by looking into mirror 16. This mirror receives and inverts the image which is received and reflected by mirror 18. If the wearer looked into mirror 18, the wearer would have an inverted view of the road ahead. Consequently, the two mirrors 16 and 18 are necessary to provide the wearer with an optically correct view of the road. The wearer initially may adjust the field of vision by changing the angle of the mirrors 16 and 18. Once the mirrors 16 and 18 are set, they do not require further adjustment. With the optical viewing apparatus 10 of the present in, the wearer may view the sides of the road ahead merely by turning the head towards the side the wearer wishes to view. Furthermore, the wearer can change the field of vision to a limited degree by moving the head up or down. If the head is positioned such that the face is pointed in a forward direction, the wearer may view the road ahead by looking straight ahead between the two mirrors 16 and 18. Additionally, the wearer may view the road ahead when the face is looking in the downward position towards the road by looking through the mirrors 16 and 18.

Although in the preferred embodiment of the present invention, the frame 14 has a hood 20 which overlies the mirrors 16 and 18, it should be apparent that the frame 14 may be fashioned in such a manner as to support the mirrors 16 and 18 in the required orientation described above without having a hood. However, it is preferable to provide the frame 14 with an integral hood 20 because it has been found that the hood significantly reduces wind resistance.

Frame 14 preferably will be constructed from a plastic material, optionally reinforced, to reduce the weight of optical viewing apparatus 10. Unbreakage plastic also is preferred for safety of the rider. Finally, the plastic may be treated to impart scratch resistance to the apparatus 10.

From the above it may be seen that the present invention provides an optical viewing apparatus which will enable a bicycle rider to view the road in front of the bicycle while looking downwardly towards the road, which is not affected by frame vibrations, which will enable a rider to have a view of the sides of the road regardless of the direction the handlebars are pointed, which provides the rider with an optimum view of the road while in any riding position, which does not increase wind resistance, significantly, and which does not require adjustment to accommodate different riding positions.

Since certain changes may be made to the above-described apparatus without departing from the scope of the invention herein, it is intended that all matter contained in the description thereof or shown in the accompaying drawings shall be interpreted as illustrative and not in a limiting sense.

We claim:

1. An optical viewing apparatus adapted to be worn on the head of a wearer which comprises:
   a frame adapted to be worn by a wearer about the eyes; and
   a first mirror and a second mirror both of which are mounted to said frame in a spaced-apart relationship, wherein one of said mirrors is positioned above the normal line of sight and closer to the face than the other of said mirrors, said mirrors being oriented such that the wearer can view objects at a distance in the horizontal plane in front of the wearer when the head is in a downwardly looking position with the normal line of sight substantially in the vertical plane.

2. The optical viewing apparatus of claim 1 in which said second mirror is positioned below the normal line of sight of said wearer when said wearer is looking straight ahead.

3. The optical viewing apparatus of claim 1 in which said first mirror is spaced apart vertically from said second mirror when the head of said wearer is in a downwardly looking position to enable the image of the road ahead to clear the lower edge of the first mirror, enter the second mirror, be reflected to the first mirror and be re-reflected into the eyes of the wearer when both mirrors are adjusted for the proper angle of incidence.

4. An optical viewing apparatus adapted to be worn on the head of a wearer which comprises:
   a frame adapted to be worn by a wearer about the eyes;
   a first mirror and a second mirror both of which are mounted to said frame in a spaced-apart relationship, wherein one of said mirrors is positioned closer to the face than the other of said mirrors, said mirrors being oriented such that the wearer can view objects in front of the wearer when the head is in a downwardly looking position; and
   said frame includes a transparent hood which overlies said first and second mirrors and said first and second mirrors are mounted to said hood.

5. The optical viewing apparatus of claim 4 in which said hood includes a front surface, a pair of side surfaces which are integral with said front surface, and openings formed in said side surfaces to enable air to flow into the portion of the face of said wearer which is behind said hood.

6. The optical viewing apparatus of claim 4 in which said hood includes a front surface and openings formed in said front surface to enable air to flow to the portion of the face of said wearer which is behind said hood.

7. The optical viewing apparatus of claim 4 in which said hood includes a front surface which overlies said first and second mirrors, a top edge which is positioned adjacent the forehead of said wearer, and a bottom edge which is spaced outwardly of the face of said wearer to enable air to flow to the portion of said wearer's face which is behind said hood.

8. A method for viewing objects in front of a bicycle rider riding a bicycle when the head of the rider is in a downwardly looking position which comprises:
   (a) placing an optical viewing apparatus on the head of the rider about the eyes, said apparatus comprising a frame adapted to be worn about the eyes and a first mirror and a second mirror both of which are mounted to said frame in spaced-apart relationship, wherein one of said mirrors is positioned closer to the face than the other of said mirrors, said mirrors being oriented such that the rider can view objects in front of said bicycle when the head is in a downwardly looking position; and
   (b) said wearer looking into one of said mirrors to view said object in front of said bicycle.

9. The method of claim 8 wherein said first mirror is spaced apart vertically from said second mirror when the head of said wearer is in said downwardly looking position to enable the image of the road ahead to clear the lower edge of said first mirror.

10. The method of claim 8 wherein said first mirror is positioned above the line of sight of said wearer when said wearer is looking straight ahead and said second mirror is positioned below the line of sight of said wearer when said wearer is looking straight ahead to enable said wearer to have a line of sight between said mirrors when the head of said wearer is in a forwardly looking position.

11. The method of claim 8 wherein the angular position of said first mirror to said frame is adjusted with adjustment means to obtain an optimum view of said object in front of said bicycle.

* * * * *